(12) United States Patent
Arana

(10) Patent No.: US 7,211,620 B2
(45) Date of Patent: May 1, 2007

(54) FOLDABLE POLYOLEFIN FILMS

(75) Inventor: Carlos Hurtado Arana, Bogota (CO)

(73) Assignee: Plasticos, Flexibles S.A., Bogota (CO)

( * ) Notice: Subject to any disclaimer, the term of this patent is extended or adjusted under 35 U.S.C. 154(b) by 79 days.

(21) Appl. No.: 11/042,987

(22) Filed: Jan. 25, 2005

(65) Prior Publication Data

US 2006/0167169 A1    Jul. 27, 2006

(51) Int. Cl.
- *C08L 23/04* (2006.01)
- *C08K 3/26* (2006.01)
- *C08K 3/34* (2006.01)

(52) U.S. Cl. ............... 524/587; 524/425; 524/451; 524/586; 524/570

(58) Field of Classification Search ............ 524/587, 524/585, 425, 401, 436, 442, 586, 451, 570; 525/240
See application file for complete search history.

(56) References Cited

U.S. PATENT DOCUMENTS

| | | | |
|---|---|---|---|
| 4,585,604 A * | 4/1986 | Okuyama et al. ............ 264/41 |
| 4,856,656 A * | 8/1989 | Sugimoto et al. ........... 206/523 |
| 4,978,486 A * | 12/1990 | Ito et al. ...................... 264/41 |
| 5,922,800 A | 7/1999 | Crotty et al. |
| 6,110,549 A * | 8/2000 | Hamada et al. ............ 428/35.2 |
| 6,727,306 B2 * | 4/2004 | Edwards et al. ............ 524/425 |
| 2003/0113496 A1* | 6/2003 | Harris et al. ............... 428/36.9 |
| 2003/0143416 A1* | 7/2003 | Watanabe et al. .......... 428/523 |
| 2006/0210801 A1* | 9/2006 | Sato et al. ............... 428/411.1 |

FOREIGN PATENT DOCUMENTS

| | | | |
|---|---|---|---|
| GB | 1 090 059 A | | 11/1967 |
| JP | 60-137948 | * | 7/1985 |
| JP | 60-137948 A | * | 7/1985 |
| JP | 03 119349 A | | 5/1991 |
| JP | 9-221568 | * | 8/1997 |
| WO | WO 94/06849 A1 | * | 3/1994 |

* cited by examiner

*Primary Examiner*—David W. Wu
*Assistant Examiner*—Rip A. Lee
(74) *Attorney, Agent, or Firm*—Wilmer Cutler Pickering Hale & Dorr LLP

(57) ABSTRACT

The present invention relates to foldable polyolefin film compositions, comprising a blend of high density polyethylene, linear low density polyethylene, a magnesium silicate and an alkaline or alkaline earth metal carbonate, to foldable polyolefin films made from such compositions and to a method for producing such.

15 Claims, 2 Drawing Sheets

FOLDABLE POLYOLEFIN FILMS

FIELD OF THE INVENTION

The present invention relates to polyolefin films which have no memory and thus can be readily folded or twisted and as a result find application as a packaging material that combines the workability of paper with the barrier and strength properties of polyolefins.

BACKGROUND FOR THE INVENTION

Polyolefin films are well known for their ability to return at least partially to their original structure when folded. However there are many applications in the packaging industry where it is desirable to provide a film that can be folded and that retains its structure once folded as can be done with paper products. It is of course desirable in such applications that the polyolefin film retains its strength, water resistance and also has the texture and rigidity of paper. Although paper-like products have been manufactured from polyolefins heretofore such products have failed either in the strength or the foldability of the film. In particular the films of the prior art have failed at the fold.

It is an object of this invention to provide polyolefin compositions that can be extruded by blown film technology into films that have little if any elastic recovery or memory and thus are able to retain any fold applied to the film. It is a further object of this invention to provide film that exhibit sufficient strength at the fold so that when they are folded they do not fail or split at the fold. It is further desirable to provide a film that has rigidity adequate to allow wrapping products using commercial wrapping machines. An additional object is to provide a paper-like packaging material that can easily and rapidly sealed.

The foldable products of the present invention are useful in all packaging applications that paper products can be used. They are particularly useful in the tobacco, food and beverage industries. The products of the present invention provide the additional properties characteristic of polyolefin and in particular barrier resistance to water and air, and furthermore are heat sealable. Additives known to improve UV light resistance can be incorporated in the films of the present invention as well as other additives known in the industry to improve desired properties. The product of the present invention can be readily laminated to others polyolefin films or to paper products and can also be coextruded with other thermoplastic materials. The mechanical properties of the films of the present invention are similarly improved over paper products in their tear resistance and tensile strength.

SUMMARY OF THE INVENTION

Figure 1:
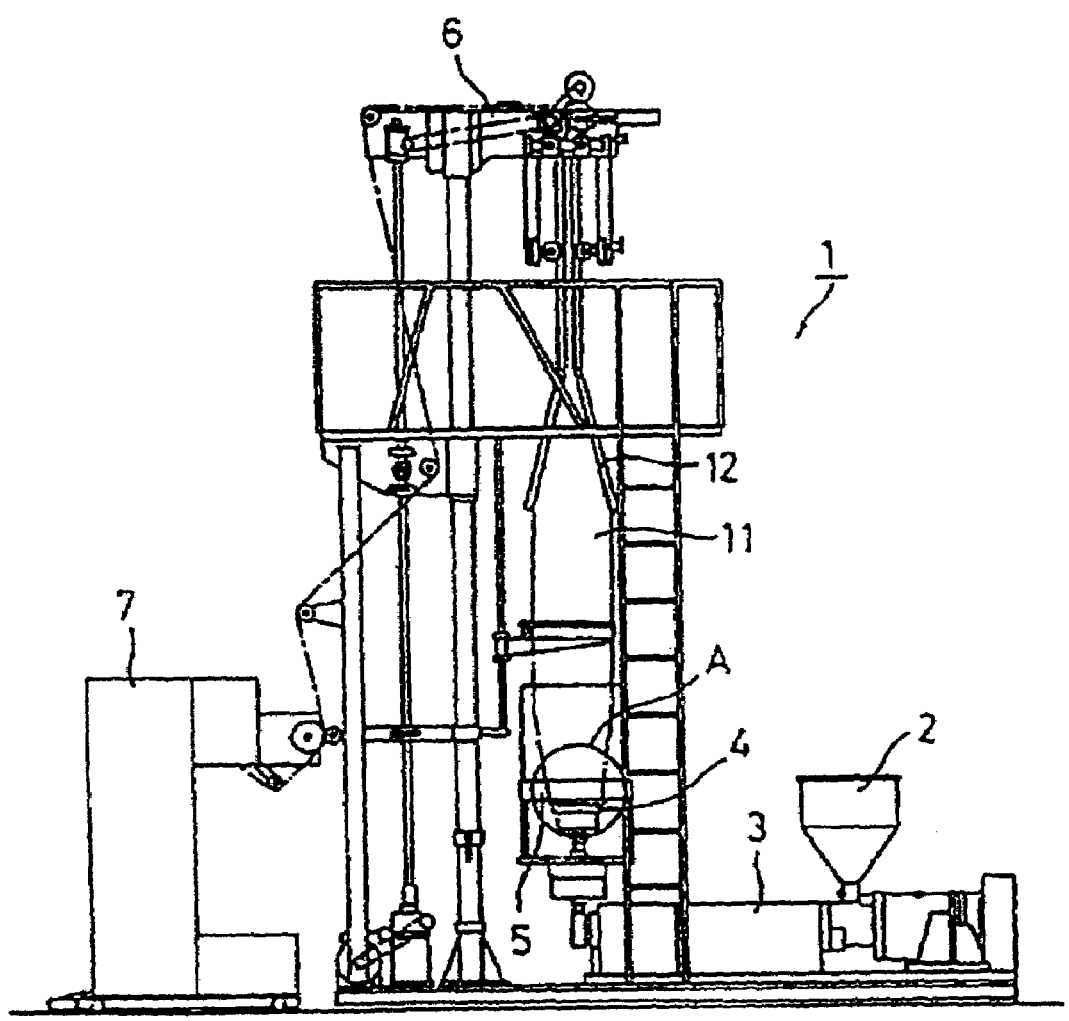
FIG. 1 is a schematic view illustrating the process of the present invention wherein a film is produced by blown film extrusion using the resin compositions of the present invention.

The objects of the present invention are accomplished by polyolefin compositions containing both a different high and a low molecular weight polyolefin component, a magnesium silicate and an inorganic carbonate. With some high molecular weight resins, the low molecular weight component may not be necessary. Additionally the composition may contain other additives imparting desirable properties to the composition such as other fillers, pigments or colorants, UV stabilizers, anti-friction and anti-blocking additives, anti-static agents, oxidation and heat stabilizers as well as other agents which aid in the fabrication of the film. The films of the present invention can be prepared using standard film extrusion methods and equipment and can be manufactured over a wide range of gauges. The films of the present invention can further be coextruded with other thermoplastic resins or laminated to different substrates such as other polyolefin films, paper, cardboard, fiber composites, non-woven fabrics and plastic foams. The present invention also relates to films obtained by the extrusion of the novel compositions of the present invention and to the processes employed to manufacture such.

DETAILED DESCRIPTION OF THE INVENTION

The high molecular weight polyolefin employed in the present invention is preferably a high molecular weight, high density polyethylene (HDPE) having a density in the range of 0.945 to 0.965 and preferably in the range of 0.950 to 0.957 and a melt index (ASTM D1238) below 0.1 and above 0.01 g/10 min, and preferably in the range of 0.04 to 0.057 g/10 min. The melt index is deemed to be inversely proportional to molecular weight. The HDPE resins employed in the present invention are commercially available. At higher melt index the films of the present invention lose some of their strength whereas at the lower melt index the compositions become difficult to extrude. At lower densities films of the compositions of the invention lose rigidity and at higher densities the compositions of the present invention are difficult to extrude in standard commercial equipment.

The low molecular weight polyolefin component is preferably a linear low density polyethylene (LLDPE) having a density in the range of 0.918 to 0.923 and a melt index (ASTM D1238) of 0.75 to 1.40 g/10 min. Such LLDPE resins are commercially available and generally are copolymers of ethylene and either octene or butene. If the molecular weight and the density are higher, the resins are more difficult to uniformly disperse in the matrix of the HDPE and if the molecular weight and density are further reduced the mechanical properties of extruded films of the compositions will deteriorate.

The HDPE is employed in the composition of the invention in a range of 35% to 91% and preferably in the range of 41% to 53% by weight of the total composition. LLDPE is employed in the range of 0% to 45% and preferably in the range of 29% to 45% of the total composition. These ranges combine the resin components in an optimum combination of fabricability and physical properties of films extruded from such.

The magnesium silicate employed in the present invention to reduce the elastic recovery of the polyolefin composition can be manufactured or naturally occurring magnesium silicate itself, such as fosterite, can be a hydrated magnesium silicate, such as $Mg_3Si_4O_{10}(OH)_2$, or can be a magnesium silicate that contains some other element such as iron in its crystal structure. The hydrated magnesium silicate is the preferred additive. The magnesium silicate that is used in the compositions of the present invention generally has a particle size below 15 micrometers and is preferably used in a particle size of one to five micrometers. The particulate magnesium silicate is employed in a range of 1 to 31 weight % and preferably in the range of 1.5 to 5 weight % and most preferably in the range of 1.9 to 3.1 weight %. At too high a concentration the extruded film will have inadequate mechanical properties whereas at too low concentrations the film will not fold readily. The magnesium silicate can be coated with a silane to improve its bonding and dispensability properties in the polyolefin matrix. Suitable silanes are well known in the industry.

The inorganic salt additive is preferably a carbonate and particularly a calcium carbonate. The calcium carbonate is generally employed in the range of about 7.5 to about 15% by weight and preferably in the range of 8. to 12 weight % and most preferably in the range of 8.5 to 10.9 weight % to provide the film with a paper-like appearance and feel. Instead of calcium carbonate similar alkali or alkaline earth metal carbonate may be used. The calcium carbonate should be finely divided to allow for a uniform distribution in the polymer blend and preferably particle sizes fall into the same range as used for the magnesium silicate.

Any additional additives such as pigments, stabilizers and anti-blocking agents are those generally employed in the art for such purposes and are used in the recommended or established concentrations for polyolefins. These additives will complete the 100% of the formulation.

The foldable films of the present invention can be prepared by first dry blending all of the ingredients and then using standard extrusion methods developed for polyolefin films such as extruded flat film or blown film to produce the packaging films of the present invention. Preferably the films are prepared by the blown film method in which the blended ingredients are fed to a screw extruder in which further blending and heating of the blended material takes place resulting in a uniformly blended melt. The molten material is then extruded through an annular die and blown into a tube causing biaxial orientation to take place. The pressure in the extruder is given by the die diameter, its die gap and is controlled by the speed of the screw (rpm). An air ring surrounding the annular die that sprays blows cold air on the extrudate at variable speeds further controls the cooling of the extruded film. The speed of the nip rolls and the quantity of air within the bubble accomplish the desired degree of orientation.

Figure 2:
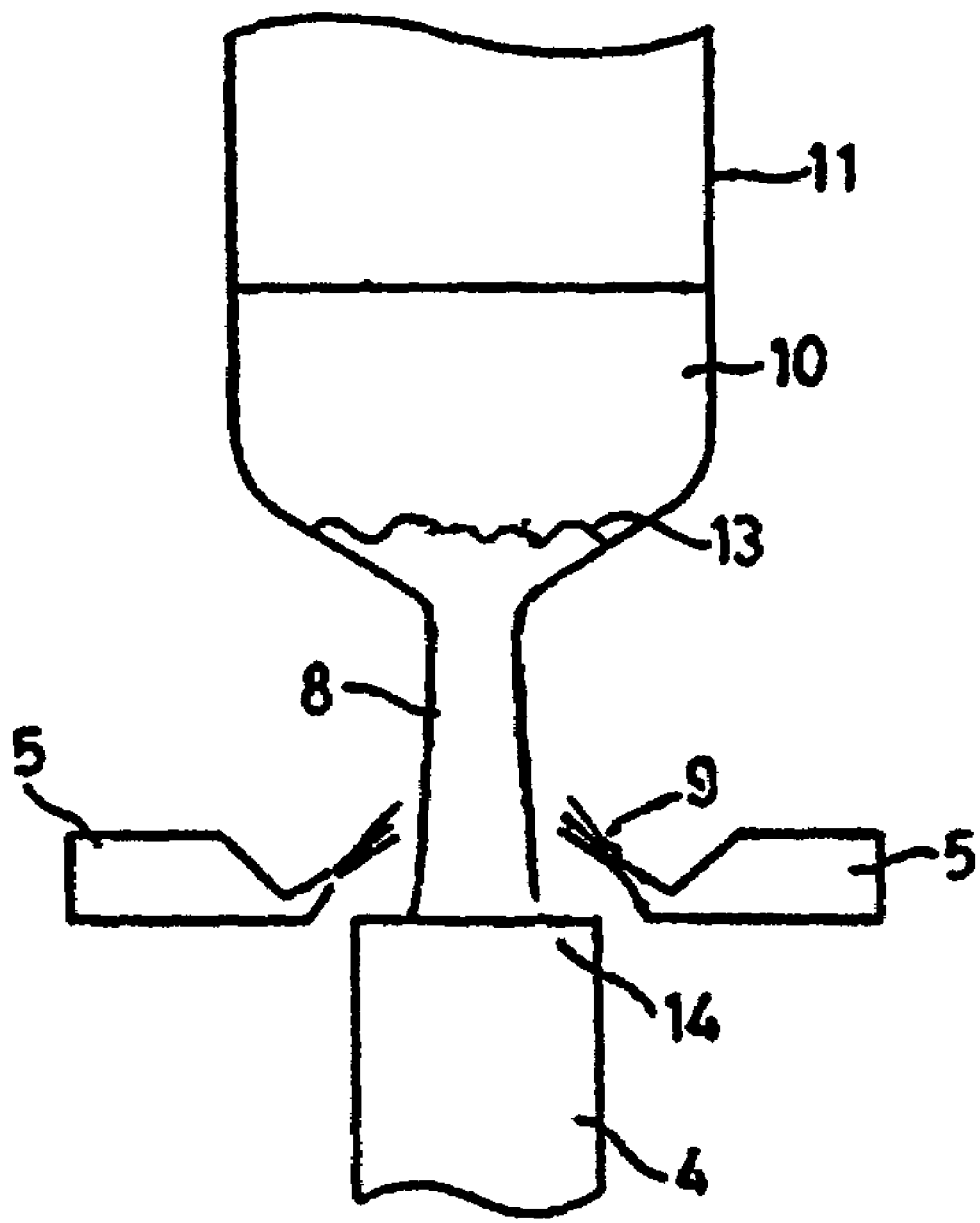
FIG. 2 is an enlarged schematic view illustrating the initial extrusion and expansion features in the production of the films of the present invention.

The method of producing the films of the present invention is more specifically illustrated in the FIG. 1 and FIG. 2. Referring to FIG. 1 the blown film extrusion system 1 comprises a hopper 2 for feeding the resin composition to the extruder 3. Prior to feeding the resin composition to the hopper the components are dry blended or melt blended in a Banbury mixer or similar device (not shown) to provide a composition which on extrusion will result in a homogeneous film. The extruder 3 can be a single or double screw extruder but preferably one that contains a feed section, a compression section and a metering section. The length of each section is generally measured in terms of the diameter (D) of the screw and for polyethylene is generally, 6 D, 8 D and 10 D respectively. After passing through the extruder the molten composition is extruded through an annular die 4 in which the molten composition is formed into a tubular shape as it exits the die. Preferred annular dies contain a spiral mandrel, which allows the forming of seamless continuous film despite the presence of the high proportion of inorganic additives. Immediately on exiting the die the tubular extrudate is sprayed with cold air from ring 5 surrounding the die. At the same time air is injected into the tubular shape, which causes the polymer to expand until it reaches the desired diameter and thus forms the bubble 11. The extruding film is drawn upwards by nip rolls 6, which collapse the bubble of the now cooled film after having passed through the film guides 12. The speed of the nip roll and the air pressure inside of the bubble can be used to control the thickness and the orientation of the film. The cooled bubble is collapsed by the nip rolls 6 and the resulting sheet film is then wound into a roll by a winder 7 and ready for packaging uses. FIG. 2 shows the schematic details of the die and initial extrusion at A as indicated in FIG. 1.

In FIG. 2 the molten film emerges from the die 4 at the annular die opening 14 and is pulled upwards by the nip rolls while simultaneously being cooled by the air stream 9 from the air ring 5. As the emerging film cylinder 8 is cooled and thinned the air pressure in the bubble 11 is adequate to start expanding the cylinder 10 and orienting the crystal structure after having reached the frost line 13. The foregoing description is not intended to be limiting and various equivalent embodiments of the equipment described are well known to those skilled in the art.

In general the extrusion is conducted at temperatures of at least 20° C. above the melting point of the blend, which is in the range of 165 to 230° C. When using a single screw extruder and a screw design most commonly used for polyethylene the extruder screw is generally rotated at a rate of 45 to 95 rpms. The key to extrusion rate is to allow for thorough mixing and uniform heating of the film composition. The annular extrusion die is generally maintained at the higher temperature to allow for a proper and uniform drawdown of the molten blend. Die openings and draw down or orientation depends on the final desired thickness and degree of orientation of the film. The blow-up ratios that can be employed in the process can vary from 1.5 to 6.0. The bubble is drawn upwards for a distance that allows the film to cool sufficiently so that when it is collapsed it does not sea to itself. Draw down speeds are selected to provide the desired linear orientation and thickness of the film and in general range from 0.5 to 70 m/min.

The compositions of the present invention may also be coextruded with such resins as polypropylene using standard coextrusion dies. The obtained films can be laminated to other materials, applying standard laminating processes.

The invention is further demonstrated by the following example, which is considered to be illustrative and not limiting.

EXAMPLE

Into standard dry mixer were loaded 48 parts of HDPE having a density of 0.953 and a melt index, as measured by ASTM D1238, of 0.05 g/10 min in pellet form, 32 parts of a LLDPE with a density of 0.918 and a melt index of 1.10 g/10 min also as measured by ASTM D1238 also in pellet form. Three parts of finely divide hydrated magnesium silicate, $Mg_3Si_4O_{10}(OH)_2$, 10 parts of finely divided commercially available calcium carbonate, 1.5 parts of a commercially antistatic agent and 5.5 parts of white pigment were added and dry blended until a uniform dry mixture was obtained. The resulting blend was automatically fed to the hopper of an Alpha Marathon Technologies Inc. blown film line, substantially as illustrated in FIG. 1, using a single screw extruder with a 65 mm diameter screw. The screw had the required feeding, compression and metering sections to produce a uniform melt and was operated at 50 rpm to produce a uniform blend at a temperature of about 200° C. The extruder was attached to an annular film extrusion die having a diameter of 100 mm and a die gap of 38 microns.

The uniformly heated melt was extruded at a temperature of 185–200° C., and at a rate of 35 kg per hour and drawn upwards for a distance of about 10 m into a set of nip rolls maintained at a film speed of about 11 m/min. Sufficient air was injected into the center of the extruding tube to cause the tube to expand into a bubble to provide a blow ratio of extrudate at the die orifice to bubble diameter above the frost line of 4.16 resulting in a bubble diameter of 65 cm. An air ring was employed blowing room temperature air to the outside of the extruding film to allow the film to cool sufficiently to be wound up without sticking. The extruded, cooled bubble was collapsed in the set of nip rolls and wound up as a flat film.

The resulting film had a thickness of 76 microns and was semi-transparent. The film could be folded and retained the fold without any elastic recovery and without cracking or splitting. It was water resistant and could be heat-sealed. It also had the rigidity and feel of paper. Other properties of the film were: Tensile strength: MD=17.1 Newtons TD, =15.2 Newtons. Elongation MD=973%, TD=956%. Tear resistance MD=85 g/cm, TD=195 g/cm. Impact strength MD=195 g, TD=310 g.

The foregoing example is demonstrative of the compositions and films of the present invention and not deemed to be limiting. Various process modifications and additives commonly employed for certain film preparation and properties may be similarly employed in the compositions of the present invention.

The invention claimed is:

1. A polyolefin composition comprising by weight of the total composition
   (A) 35 to 91% of a high density polyethylene having a density of 0.945 to 0.965 and a melt index as determined by ASTM D1238 of 0.01 to 0.1 g/10 min;
   (B) 0 to 45% of a linear low density polyethylene having a density of 0.918 to 0.923 and a melt index of, as determined by ASTM D1238, of 0.75 to 1.40 g/10 min;
   (C) 1 to 3.1% of a particulate magnesium silicate; and
   (D) 7.5 to 15% of an alkali or alkaline earth metal carbonate.

2. The polyolefin composition of claim 1, comprising by weight of the total composition
   (A) 41 to 53% of the high density polyethylene;
   (B) 29 to 45% of the linear low density polyethylene
   (C) 1.5 to 3.1% of the particulate magnesium silicate; and
   (D) 8 to 12% of the alkali or alkaline earth metal carbonate.

3. The polyolefin composition of claim 2 wherein the magnesium silicate is a hydrated magnesium silicate and has a particle size of less than 15 micrometers.

4. The polyolefin composition of claim 2 wherein the carbonate is calcium carbonate.

5. The polyolefin composition of claim 2 comprising by weight of the total composition
   (A) 41 to 53% of the high density polyethylene
   (B) 29 to 45% of the linear low density polyethylene
   (C) 1.9 to 3.1% of the magnesium silicate and
   (D) 10.9 to 12% of the alkali or alkaline earth carbonate.

6. The polyolefin composition of claim 2 wherein the composition further comprises from 0.5 to 1.5 weight % of an antifriction agent.

7. The polyolefin composition of claim 2 wherein the composition further comprises from 0.5 to 1.5% of an antiblocking agent.

8. The polyolefin composition of claim 2 wherein the alkali or alkaline earth metal carbonate is calcium carbonate and is employed in a concentration of 8.5 to 10.9 weight %.

9. The polyolefin composition of claim 1, comprising:
   (A) 47.0 to 47.5% of the high density polyethylene;
   (B) 38.0 to 38.5% of the linear low density polyethylene;
   (C) 2.5 to 2.7% of the magnesium silicate; and
   (D) 11.5 to 12.0% of the alkali or alkaline earth carbonate.

10. The polyolefin composition of claim 1, comprising:
    (A) 46.0 to 46.5% of the high density polyethylene;
    (B) 37.0 to 37.5% of the linear low density polyethylene;
    (C) 2.5 to 2.7% of the magnesium silicate;
    (D) 11.5 to 12.0% of the alkali or alkaline earth carbonate; and
    (E) 1 to 2% of one or more additives.

11. A method for producing a film, the method comprising:
    blending a composition which comprises:
    (A) 35 to 91% of a high density polyethylene having a density of 0.945 to 0.965 and a melt index as determined by ASTM D1238 of 0.01 to 0.1 g/10 min;
    (B) 0 to 45% of a linear low density polyethylene having a density of 0.918 to 0.923 and a melt index of, as determined by ASTM D1238, of 0.75 to 1.40 g/10 min;
    (C) 1 to 3.1% of a particulate magnesium silicate; and
    (D) 7.5 to 15% of an alkali or alkaline earth metal carbonate; and
    extruding the composition at a temperature of 180 to 230° C. through an annular die into a bubble at a rate of 0.5 to 70 m/min using a draw down ratio of 2 to 6.

12. The method of claim 11, wherein the composition comprises:
    (A) 41 to 53% of the high density polyethylene;
    (B) 29 to 45% of the linear low density polyethylene;
    (C) 1.5 to 3.1% of the particulate magnesium silicate; and
    (D) 8 to 12% of the alkali or alkaline earth metal carbonate; and
    wherein the extruding is carried out at a temperature of about 200° C. at a rate of about 10 m/min using a draw down ratio of about 4.2.

13. A film comprising:
    (A) 35 to 91% of a high density polyethylene having a density of 0.945 to 0.965 and a melt index as determined by ASTM D1238 of 0.01 to 0.1 g/10 min;
    (B) 0 to 45% of a linear low density polyethylene having a density of 0.918 to 0.923 and a melt index of, as determined by ASTM D1238, of 0.75 to 1.40 g/10 min;
    (C) 1 to 3.1% of a particulate magnesium silicate; and
    (D) 7.5 to 15% of an alkali or alkaline earth metal carbonate.

14. The film of claim 12, comprising:
    (A) 47.0 to 47.5% of the high density polyethylene;
    (B) 38.0 to 38.5% of the linear low density polyethylene;
    (C) 2.5 to 2.7% of the magnesium silicate; and
    (D) 11.5 to 12.0% of the alkali or alkaline earth carbonate.

15. The film of claim 13, comprising:
    (A) 46.0 to 46.5% of a the high density polyethylene;
    (B) 37.0 to 37.5% of a the linear low density polyethylene;
    (C) 2.5 to 2.7% of the magnesium silicate;
    (D) 11.5 to 12.0% of the alkali or alkaline earth carbonate; and
    (E) 1 to 2% of one or more additives.

* * * * *